US006438837B1

(12) United States Patent
Berry et al.

(10) Patent No.: US 6,438,837 B1
(45) Date of Patent: Aug. 27, 2002

(54) METHODS FOR ALIGNING HOLES THROUGH WHEELS AND SPACERS AND STACKING THE WHEELS AND SPACERS TO FORM A TURBINE ROTOR

(75) Inventors: Robert Randolph Berry, Greenville, SC (US); Gene David Palmer; Ian David Wilson, both of Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/534,048

(22) Filed: Mar. 24, 2000

Related U.S. Application Data

(62) Division of application No. 09/275,633, filed on Mar. 24, 1999, now Pat. No. 6,158,102.

(51) Int. Cl.[7] .......... B23P 15/00
(52) U.S. Cl. .......... 29/889; 29/889.2; 29/464
(58) Field of Search .......... 29/889, 889.2, 29/464

(56) References Cited

U.S. PATENT DOCUMENTS 4,581,816 A * 4/1986 Klufas et al. .......... 29/889.2
5,504,987 A * 4/1996 Bergkvist .......... 29/700
5,745,968 A * 5/1998 Genest et al. .......... 29/270
5,745,994 A * 5/1998 Honnorat .......... 29/889.2
5,830,312 A * 11/1998 Weimer et al. .......... 156/503

OTHER PUBLICATIONS

"39$^{th}$ GE Turbine State–of–the–Art Technology Seminar", Tab 1, ""F" Technology –the First Half–Million Operating Hours", H.E. Miller, Aug. 1996.

"39th GE Turbine State–of–the–Art Technology Seminar", Tab 2, "GE Heavy–Duty Gas Turbine Performance Characteristics", F.J. Brooks, Aug. 1996.

"39th GE Turbine State–of–the–Art Technology Seminar", Tab 3, "9EC 50Hz 170–MW Class Gas Turbine", A.S. Arrao, Aug. 1996.

"39th GE Turbine State–of–the–Art Technology Seminar", Tab 4, "MWS6001FA –An Advanced–Technology 70–MW Class 50/60 Hz Gas Turbine", Ramachandran et al., Aug. 1996.

"39th GE Turbine State–of–the–Art Technology Seminar", Tab 5, "Turbomachinery Technology Advances at Nuovo Pignone", Benvenuti et al., Aug. 1996.

"39th GE Turbine State–of–the–Art Technology Seminar", Tab 6, "GE Aeroderivative Gas Turbines –Design and Operating Features", M.W. Horner, Aug. 1996.

(List continued on next page.)

*Primary Examiner*—I Cuda Rosenbaum
(74) *Attorney, Agent, or Firm*—Nixon & Vanderhye

(57) ABSTRACT

A method of stacking a plurality of wheels and spacers forming a rotor for a turbine, the wheels and spacers having a plurality of circumferentially spaced, axially extending openings spaced radially from axes of the wheels and spacers including providing a support fixture having an axis and disposing a plurality of alignment rods about the fixture in circumferentially spaced relation to one another about and generally parallel to the axis. Each of the rods has a cross-section with a radial dimension less than a circumferential dimension. The method includes disposing the wheels and spacers on the support fixture with the alignment rods extending through the openings with clearances between the rods and margins of the openings being greater in a radial direction than in a circumferential direction.

4 Claims, 6 Drawing Sheets

OTHER PUBLICATIONS

"39th GE Turbine State–of–the–Art Technology Seminar", Tab 7, "Advance Gas Turbine Materials and Coatings", P.W. Schilke, Aug. 1996.

"39th GE Turbine State–of–the–Art Technology Seminar", Tab 8, "Dry Low $NO_x$ Combustion Systems for GE Heavy––Duty Turbines", L.B. Davis, Aug. 1996.

"39th GE Turbine State–of–the–Art Technology Seminar", Tab 9, "GE Gas Turbine Combustion Flexibility", M.A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cyles", Chu et al., Aug. 1996.

"39th GE Turbine State–of the–Art Technology Seminar", Tab 12, "Power Systems for the 21st Century "H" Gas Turbine Combined Cycles", Paul et al., Aug. 1996.

"39th GE Turbine State–of the–Art Technology Seminar", Tab 13, "Clean Coal and Heavy Oil Technologies for Gas Turbines", D.M. Todd, Aug. 1996.

"39th GE Turbine State–of the–Art Technology Seminar", Tab 14, "Gas Turbine Conversions, Modifications and Uprates Technology", Stuck et al., Aug. 1996.

"39th GE Turbine State–of the–Art Technology Seminar", Tab 15, "Performance and Reliability Improvements for Heavy–Duty Gas Turbines, "J.R. Johnston, Aug. 1996.

"39th GE Turbine State–of the–Art Technology Seminar", Tab 16, "Gas Turbine Repair Technology", Crimi et al., Aug. 1996.

"39th GE Turbine State–of the–Art Technology Seminar", Tab 17, "Heavy Duty Turbine Operating & Maintenance Considerations", R.F. Hoeft, Aug. 1996.

"39th GE Turbine State–of the–Art Technology Seminar", Tab 18, "Gas Turbine Performance Monitoring and Testing", Schmitt et al., Aug. 1996.

"39th GE Turbine State–of the–Art Technology Seminar", Tab 19, "Monitoring Service Delivery System and Diagnostics", Madej et al., Aug. 1996.

"39th GE Turbine State–of the–Art Technology Seminar", Tab 20, "Steam Turbines for Large Power Applications", Reinker et al., Aug. 1996.

"39th GE Turbine State–of the–Art Technology Seminar", Tab 21, "Steam Turbines for Ultrasupercritical Power Plants", Retzlaff et al., Aug. 1996.

"39th GE Turbine State–of the–Art Technology Seminar", Tab 22, "Steam Turbine Sustained Efficiency", P. Schofield, Aug. 1996.

"39th GE Turbine State–of the–Art Technology Seminar", Tab 23, "Recent Advances in Steam Turbines for Industrial and Cogeneration Applications", Leger et al., Aug. 1996.

"39th GE Turbine State–of the–Art Technology Seminar", Tab 24, "Mechanical Drive Steam Turbines", D.R. Leger, Aug. 1996.

"39th GE Turbine State–of the–Art Technology Seminar", Tab 25, "Steam Turbins for STAG$^{TM}$ Combined–Cycle Power Systems", M. Boss, Aug. 1996.

"39th GE Turbine State–of the–Art Technology Seminar", Tab 26, "Cogeneration Application Considerations", Fisk et al., Aug. 1996.

"39th GE Turbine State–of the–Art Technology Seminar", Tab 27, "Performance and Economic Considerations of Repowering Steam Power Plants", Stoll et al., Aug. 1996.

"39th GE Turbine State–of the–Art Technology Seminar", Tab 28, "High–Power–Density$^{TM}$ Steam Turbine Design Evolution", J.H. Moore, Aug. 1996.

"39th GE Turbine State–of the–Art Technology Seminar", Tab 29, "Advances in Steam Path Technologies", Cofer, IV, et al., Aug. 1996.

"39th GE Turbine State–of the–Art Technology Seminar", Tab 30, "Upgradable Opportunities for Steam Turbines", D.R. Dreier, Jr., Aug. 1996.

"39th GE Turbine State–of the–Art Technology Seminar", Tab 31, "Uprate Options for Industrial Turbines", R.C. Beck, Aug. 1996.

"39th GE Turbine State–of the–Art Technology Seminar", Tab 32, "Thermal Performance Evaluation and Assessment of Steam Turbine Units", P. Albert, Aug. 1996.

"39th GE Turbine State–of the–Art Technology Seminar", Tab 33, "Advances in Welding Repair Technology" J.F. Nolan, Aug. 1996.

"39th GE Turbine State–of the–Art Technology Seminar", Tab 34, "Operation and Maintenance Strategies to Enhance Plant Profitability", MacGillivray et al., Aug. 1996.

"39th GE Turbine State–of the–Art Technology Seminar", Tab 35, "Generator Insitu Inspections", D. Stanton.

"39th GE Turbine State–of the–Art Technology Seminar", Tab 36, "Generator Upgrade and Rewind", Halpern et al., Aug. 1996.

"39th GE Turbine State–of the–Art Technology Seminar", Tab 37, "GE Combined Cycle Product Line and Performance", Chase, et al., Aug. 1996.

"39th GE Turbine State–of the–Art Technology Seminar", Tab 38, "GE Combined Cycle Experience", Maslak et al., Aug. 1996.

"39th GE Turbine State–of the–Art Technology Seminar", Tab 39, "Single–Shaft Combined Cycle Power Generation Systems", Tomlinson et al., Aug. 1996.

"Advanced Turbine System Program –Conceptual Design and Product Development", Annual Report, Sep. 1, 1994 –Aug. 31, 1995.

"Advanced Turbine Systems (ATS Program) Conceptual Design and Product Development", Final Technical Progress Report, vol. 2–Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993 –Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Nos. DE–FC21–95MC31176—11.

"Exhibit panels used at 1995 product introduction at PowerGen Europe".
"Extensive Testing Program Validates High Efficiency, reliability of GE's Advanced "H" Gas Turbine Technology", Press Information, Press Release, 96–NR14, Jun. 26, 1996, H Technology Tests/pp. 1–4.
"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency", Press Information, Press Release, Power–Gen Europe '95, 95–NRR15, Advanced Technology Introduction/pp. 1–6.
"Gas, Steam Turbine Work as Single Unit in GE's Advanced H Technology Combined–Cycle System", Press Information, Press Release, 95–NR18, May 16, 1995, Advanced Technology Introduction/pp. 1–3.
"GE Breaks 60% Net Efficiency Barrier" paper, 4 pages.
"GE Businesses Share Technologies and Experts to Develop State–Of–The–Art Products", Press Information, Press Release 95–NR10, May 16, 1995, GE Technology Transfer/pp. 1–3.
"General Electric ATS Program Technical Review, Phase 2 Activities", T. Chance et al., pp. 1–4.
"General Electric's DOE/ATS H Gas Turbine Development" Advanced Turbine SYstems Annual Review Meeting, Nov. 7–8, 1996, Washington, D.C., Publication Release.
"H Technology Commercialization", 1998 MarComm Activity Recommendation, Mar., 1998.
"H Technology", Jon Ebacher, VP, Power Gen Technology, May 8, 1998.
"H Testing Process", Jon Ebacher, VP Power Gen Technology, May 8, 1998.
"Heavy–Duty & Aeroderivative Products" Gas Turbines, Brochure, 1998.
"MS7001H/MS9001H Gas Turbine, gepower.com website for PowerGen Europe" Jun. 1–3 going public Jun. 15, (1995).
"New Steam Cooling System is a Key to 60% Efficiency For GE "H" Technology Combined–Cycle Systems", Press Information, Press Release, 95–NRR16, May 16, 1995, H Technology/pp. 1–3.
"Overview of GE's H Gas Turbine Combined Cycle", Jul. 1, 1995 to Dec. 31, 1997.
"Power Systems for the 21$^{st}$ Century –"H" Gas Turbine Combined Cycles", Thomas C. Paul et al., Report,
"Power–Gen '96 Europe", Conference Programme, Budapest, Hungary, Jun. 26–28, 1996.
"Power–Gen International", 1998 Show Guide, Dec. 9–11, 1998, Orange County Convention Center, Orlando, Florida.
"Press Coverage following 1995 product announcement"; various newspaper clippings relating to improved generator.
"Proceedings of the Advanced Turbine Systems Annual Program Review Meeting", vol. I, "Industrial Advanced Turbine Systems Program Overview", D.W. Esbeck, pp. 3–13, Oct., 1995.
"Proceedings of the Advanced Turbine Systems Annual Program Review Meeting", vol. I, "H Gas Turbine Combined Cycle", J. Corman, pp. 14–21, Oct., 1995.
"Proceedings of the Advanced Turbine Systems Annual Program Review Meeting", vol. I, "Overview of Westinghouse's Advanced Turbine Systems Program", Bannister et al., pp. 22–30, Oct., 1995.
"Proceedings of the Advanced Turbine Systems Annual Program Review Meeting", vol. I, "Allison Engine ATS Program Technical Review", D. Mukavetz, pp. 31–42, Oct., 1995.
"Proceedings of the Advanced Turbine Systems Annual Program Review Meeting", vol. I, "Advanced Turbine Systems Program Industrial System Concept Development", S. Gates, pp. 43–63, Oct., 1995.
"Proceedings of the Advanced Turbine Systems Annual Program Review Meeting", vol. I, "Advanced Turbine System Program Phase 2 Cycle Selection", Latcovich, Jr., pp. 64–69, Oct., 1995.
"Proceedings of the Advanced Turbine Systems Annual Program Review Meeting", vol. I, "General Electric ATS Program Technical Review Phase 2 Activities", Chance et al., pp. 70–74, Oct., 1995.
"Proceedings of the Advanced Turbine Systems Annual Program Review Meeting", vol. I, "Technical Review of Westinghouse's Advanced Turbine Systems Program", Diakunchak et al., pp. 75–86, Oct., 1995.
"Proceedings of the Advanced Turbine Systems Annual Program Review Meeting", vol. I, "Advanced Combustion Turbines and Cycles: An EPRI Perspective", Touchton et al., pp. 87–88, Oct., 1995.
"Proceedings of the Advanced Turbine Systems Annual Program Review Meeting", vol. I, "Advanced Turbine Systems Annual Program Review", William E. Koop, pp. 89–92, Oct., 1995.
"Proceedings of the Advanced Turbine Systems Annual Program Review Meeting", vol. I, "The AGTSR Consortium: An Update", Fant et al., pp. 93–102, Oct., 1995.
"Proceedings of the Advanced Turbine Systems Annual Program Review Meeting", vol. I, "Overview of Allison/AGTSR Interactions", Sy A. Ali, pp. 103–106, Oct., 1995.
"Proceedings of the Advanced Turbine Systems Annual Program Review Meeting", vol. I, "Design Factors for Stable Lean Premix Combustion", Richards et al., pp. 107–113, Oct., 1995.
"Proceedings of the Advanced Turbine Systems Annual Program Review Meeting", vol. I, "Ceramic Stationary as Turbine", M. van Roode, pp. 114–147, Oct., 1995.
"Proceedings of the Advanced Turbine Systems Annual Program Review Meeting", vol. I, "DOE/Allison Ceramic Vane Effort", Wenglarz et al., pp. 148–151, Oct., 1995.
"Proceedings of the Advanced Turbine Systems Annual Program Review Meeting", vol. I, "Materials/ Manufacturing Element of the Advanced Turbine Systems Program", Karnitz et al., pp. 152–160, Oct., 1995.
"Proceedings of the Advanced Turbine Systems Annual Program Review Meeting", vol. I, "Land–Based Turbine Casting Initiative", Mueller et al., pp. 161–170, Oct., 1995.
"Proceedings of the Advanced Turbine Systems Annual Program Review Meeting", vol. I, "Turbine Airfoil Manufacturing Technology", Kortovich, pp. 171–181, Oct., 1995.
"Proceedings of the Advanced Turbine Systems Annual Program Review Meeting", vol. I, "Pratt & Whitney Thermal Barrier Coatings", Bornstein et al., pp. 182–193, Oct., 1995.
"Proceedings of the Advanced Turbine Systems Annual Program Review Meeting", vol. I, "Westinhouse Thermal Barrier Coatings", Goedjen et al., pp. 194–199, Oct., 1995.
"Proceedings of the Advanced Turbine Systems Annual Program Review Meeting", vol. I, "High Performance Steam Development", Duffy et al., pp. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., pp. 221–232, Oct., 1995.

"Proceedings of the Advanced Turbine Systems Annual Program Review Meeting", vol. II, Rayleigh/Raman/LIF Measurements in a Turbulent Lean Premixed Combustor", Nandula et al., pp. 233–248, Oct., 1995.

"Proceedings of the Advanced Turbine Systems Annual Program Review Meeting", vol. II, "Lean Premixed Flames for Low $No_x$ Combustors", Sojka et al., pp. 249–275, Oct., 1995.

"Proceedings of the Advanced Turbine Systems Annual Program Review Meeting", vol. II, Functionally Gradient Materials for Thermal Barrier Coatings in Advanced Gas Turbine Systems", Banovic et al., pp. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al., pp. 310–327, Oct., 1995.

"Proceedings of the Advanced Turbine Systems Annual Program Review Meeting", vol. II, "Advanced Combustion Technologies for Gas Turbine Power Plants", Vandsburger et al., pp. 328–352, Oct., 1995.

"Proceedings of the Advanced Turbine Systems Annual Program Review Meeting", vol. II, "Combustion Modeling in Advanced Gas Turbine Systems", Smoot et al., pp. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al., pp. 371–390, Oct., 1995.

"Proceedings of the Advanced Turbine Systems Annual Program Review Meeting", vol. II, "Rotational Effects on Turbine Blade Cooling", Govatzidakia et al., pp. 391–392, Oct., 1995.

"Proceedings of the Advanced Turbine Systems Annual Program Review Meeting", vol. II, "Manifold Methods for Methane Combustion", Yang et al., pp. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting", vol. II, "The Role of Reactant Unmixedness, Strain Rate, and Length Scale and Premixed Combustor Performance, Samuelsen et al., pp. 415–422, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. II, "Compatibility of Gas Turbine Materials with Steam Cooling", Desai et al., pp. 454–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M.K. Chyu, pp. 465–473, Oct., 1995.

"Proceedings of the Advanced Turbine Systems Annual Program Review Meeting", vol. II, "Effects of Geometry on Slot–Jet Film Cooling Performance, Hyams et al., pp. 474–496 Oct., 1995.

"Proceedings of the Advanced Turbine Systems Annual Program Review Meeting", vol. II, "Steam as Turbine Blade Coolant: Experimental Data Generation", Wilmsen et al., pp. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., pp. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", vol. II, "Active Control of Combustion Instabilities in Low $NO_x$ Gas Turbines", Zinn et al., pp. 550–551, Oct., 1995.

"Proceedings of the Advanced Turbine Systems Annual Program Review Meeting", vol. II, "Combustion Instability Modeling and Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, pp. 3–16, Nov., 1996.

"Proceedings of the Advanced Turbine Systems Annual Program Review Meeting", "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Westinghouse's Advanced Turbine Systems Program", Gerard McQuiggan, pp. 35–48, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov., 1996.

"Proceedings of the Advanced Turbine Systems Annual Program Review Meeting", "The AGTSR Industry–University Consortium", Lawrence P. Golan, pp. 95–110, Nov., 1996.

"Proceedings of the Advanced Turbine Systems Annual Program Review Meeting", "$NO_x$ and CO Emmisions Models for Gas–Fired Lean–Premixed Combustion Turbines", A. Mellor, pp. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov., 19967.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", Active Control of Combustion Instabilities in Low $NO_x$ Turbines", Ben T. Zinn, pp. 253–264, Nov., 1996.

"Proceedings of the Advanced Turbine Systems Annual Program Review Meeting", "Life Prediction of Advanced Materials for Gas Turbine Application," Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Laksshiminarayana, pp. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling, Heat Transfer, and Aerodynamic Studies", Je–Chin Han, pp. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, pp. 461–470, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting Wang, pp. 499–512, Nov., 1996.

"Proceedings of the Advanced Turbine Systems Annual Program Review Meeting", "Heat Pipe Turbine Vane Cooling", Langston et al., pp. 513–534, Nov., 1996.

"Proceedings of the Advanced Turbine Systems Annual Program Review Meeting", "EPRI's Combustion Turbine Program: Status and Future Directions", Arthur Cohn, pp. 535–552 Nov., 1996.

"Proceedings of the Advanced Turbine Systems Annual Program Review Meeting", "ATS Materials Support", Michael Karnitz, pp. 553–576, Nov., 1996.

"Proceedings of the Advanced Turbine Systems Annual Program Review Meeting", "Land Based Turbine Casting Initiative", Boyd A. Mueller, pp. 577–592, Nov., 1996.

"Proceedings of the Advanced Turbine Systems Annual Program Review Meeting", "Turbine Airfoil Manufacturing Technology", Charles S. Kortovich, pp. 593–622, Nov., 1996.

"Proceedings of the Advanced Turbine Systems Annual Program Review Meeting", "Hot Corrosion Testing of TBS's", Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramics for Gas Turbines", Tibor Bornemisza, pp. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's Advanced Turbine systems Program", facsimile dated Nov. 7, 1996.

"Testing Program Results Validate GE's H Gas Turbine –High Efficiency, Low Cost of Electricity and Low Emissions", Roger Schonewald and Patrick Marolda, (no date available),.

"Testing Program Results Validate GE's H Gas Turbine –High Efficiency, Low Cost of Electricity and Low Emissions", Slide Presentation –working draft, (no date available).

"The Next Step In H. . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Nos.: DOE/MC/31176—5628,.

"Utility Advanced Turbine System (ATS) Technology Readiness Testing —Phase 3", Document #666274, Oct. 1, 1996–Sep. 30, 1997, Publication Date, Dec. 31, 1997, Report Nos.: DOE/MC/31176–10.

"Utility Advanced Turbine System (ATS) Technology Readiness Testing and Pre–Commerical Demonstration, Phase 3", Document #486029, Oct. 1–Dec. 31, 1995, Publication Date, May 1, 1997, Report Nos.: DOE/MC/31176–5340.

"Utility Advanced Turbine System (ATS) Technology Readiness Testing and Pre–Commercial Demonstration–Phase 3", Document #486132, Apr. 1–Jun. 30, 1976, Publication Date, Dec. 31, 1996, Report Nos.: DOE/MC/31176–5660.

"Utility Advanced Turbine System (ATS) Technology Readiness Testing and Pre–Commercial Demonstration–Phase 3", Document #587906, Jul. 7–Sep. 30, 1995, Publication Date, Dec. 31, 1995, Report Nos.: DOE/MC/31176–5339.

"Utility Advanced Turbine System (ATS) Technology Readiness Testing and Pre–Commercial Demonstration" Document #666277, Apr. 1–Jun. 30, 1997, Publication Date, Dec. 31, 1997, Report Nos.: DOE/MC/31176–8.

"Utility Advanced Turbine System (ATS) Technology Readiness Testing and Pre–Commercial Demonstration" Jan. 1–Mar. 31, 1996, DOE/MC/31176—5338.

"Utility Advanced Turbine System (ATS) Technology Readiness Testing: Phase 3R", Document #756552, Apr. 1–Jun. 30, 1999, Publication Date, Sep. 1, 1999, Report Nos.: DE—FC21–95MC31176–23.

"Utility Advanced Turbine System (ATS) Technology Readiness Testing.", Document #656823, Jan. 1–Mar. 31, 1998, Publication Date, Aug. 1, 1998, Report Nos.: DOE/MC/31176–17.

"Utility Advanced Turbine System (ATS) Technology Readiness Testing and Pre–Commercial Demonstration", Annual Technical Progress Report, Reporting Period: Jul. 1, 1995–Sep. 30, 1996.

"Utility Advanced Turbine System (ATS) Technology Readiness Testing", Phase 3R, Annual Technical Progress Report, Reporting Period: Oct. 1, 1997–Sep. 30, 1998.

"Utility Advanced Turbine System (ATS) Technology Readiness Testing", Document #750405, Oct. 1–Dec. 30, 1998, Publication Date: May 1, 1999, Report Nos.: DE–FC21–95MC31176–20.

"Utility Advanced Turbine System (ATS) Technology Readiness Testing", Document #1348, Apr. 1–Jun. 29, 1998, Publication Date Oct. 29, 1998, Report Nos. DE–FC21–95MC31176–18.

"Utility Advanced Turbine System (ATS) Technology Readiness Testing –Phase 3", Annual Technical Progress Report, Reporting Period: Oct. 1, 1996,–Sep. 30, 1997.

"Utility Advanced Turbine System (ATS) Technology Readiness Testing and Pre–Commercial Demonstration", Quarterly Report, Jan. 1–Mar. 31, 1997, Document #666275, Report Nos.: DOE/MC/31176–07.

"Proceedings of the 1997 Advanced Turbine Systems", Annual Program Review Meeting, Oct. 28–29, 1997.

* cited by examiner

FIG. 7
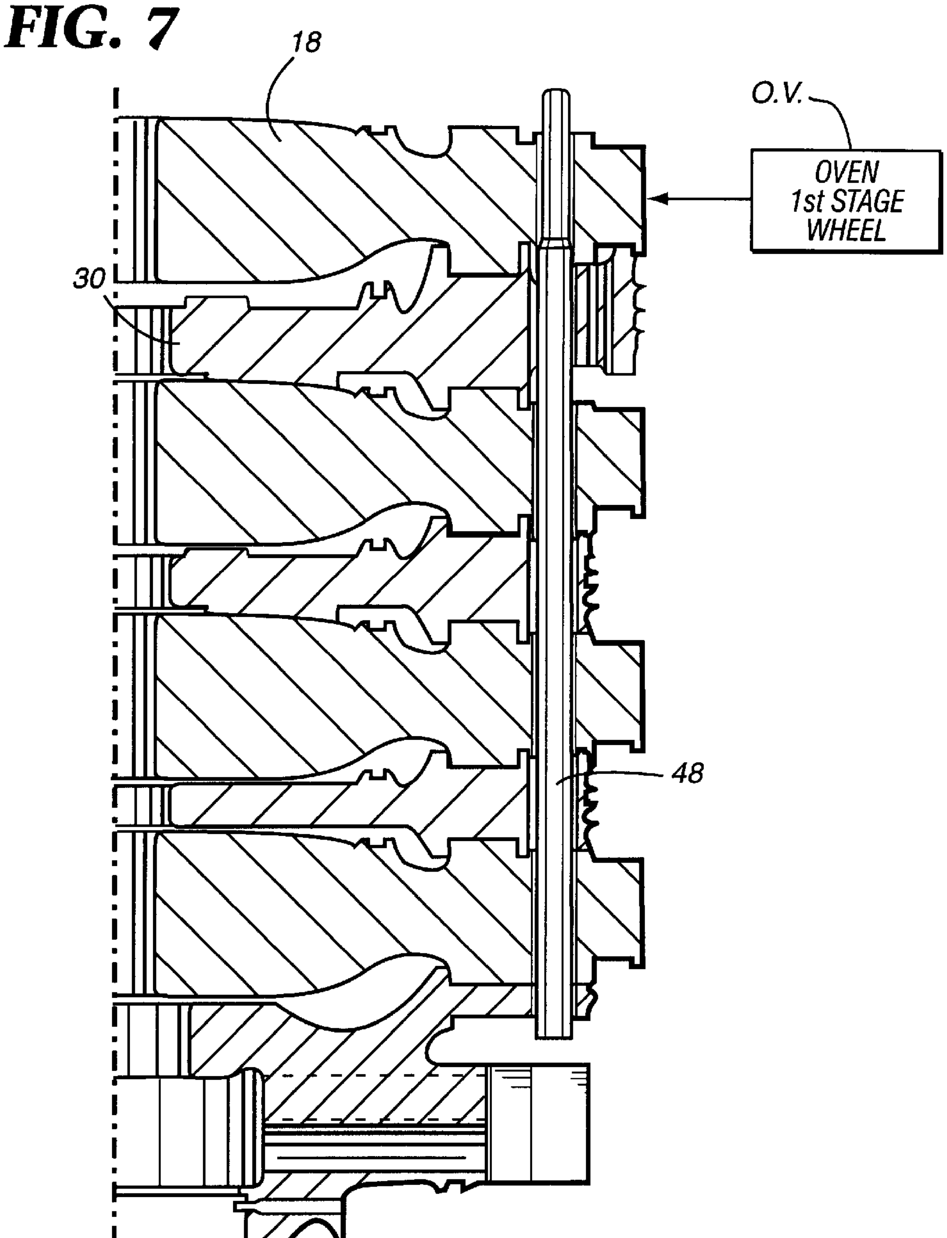
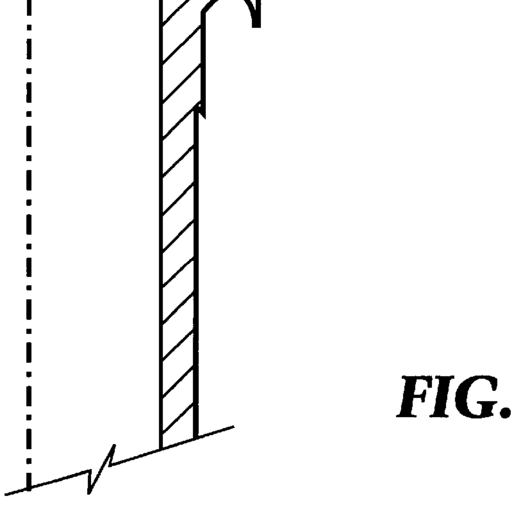
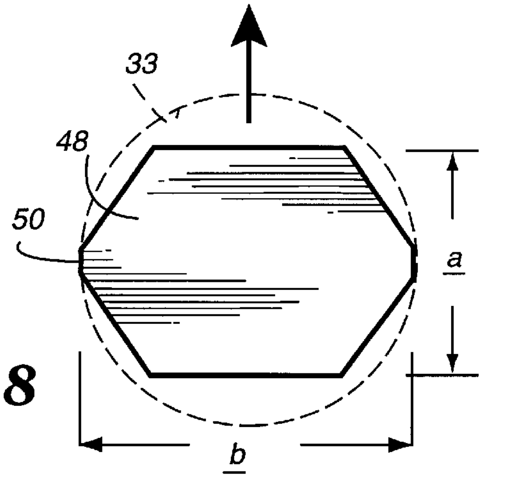
FIG. 8

METHODS FOR ALIGNING HOLES THROUGH WHEELS AND SPACERS AND STACKING THE WHEELS AND SPACERS TO FORM A TURBINE ROTOR

This is a divisional of application Ser. No. 09/275,633, filed Mar. 24, 1999, U.S. Pat. No. 6158,102, the entire content of which is hereby incorporated by reference in this application.

TECHNICAL FIELD

The present invention relates to apparatus and methods for aligning openings through wheels and spacers during assembly to form a turbine rotor stack enabling subsequent insertion of steam tubes into the aligned openings with the tightest possible clearances between the openings and tubes and particularly relates to a fixture having alignment pins shaped to enable tangential alignment of the elements of the rotor stack without constricting radial alignment.

BACKGROUND OF THE INVENTION

Gas turbine rotors are typically formed by stacking the rotor wheels and spacers axially one against the other. Bolt holes are provided through the wheels and spacers and receive bolts which are used to finally secure the wheels and spacers to one another to form the rotor. The wheels and spacers in final assembly also have rabbeted joints. That is, axially projecting flanges formed on the spacers underlie and fit tightly against axially oppositely extending flanges formed on the wheels. To form the rabbeted joints, the wheels are typically heated in an oven prior to assembly in the stack to expand the flanges of the wheels so that, after stacking and upon cool-down, the flanges of adjacent wheels and spacers fit tightly relative to one another.

During stack-up of the wheels and spacers, the bolt holes of the wheels and spacers are fitted over bolts projecting from a fixture. The bolts remain in the rotor assembly and maintain the wheels and spacers stacked relative to one another. Consequently, to enable the stack-up of the wheels and spacers on the bolts, substantial clearances between the bolt holes through the wheels and spacers and the bolts are necessary in the radial direction and corresponding clearances are therefore also provided in the circumferential direction. A need has developed, however, for a much tighter alignment of the stacked wheels and spacers which cannot be provided by the alignment of the bolt holes and bolts during the assembly stack-up consistent with the need to accommodate radial expansion and contraction of the heated wheels during the stack-up.

This need has arisen as a result of a new advanced steam-cooled gas turbine design of the assignee of the present invention wherein certain parts of the rotor are steam-cooled. In this advanced steam-cooled turbine design, a plurality of openings, in addition to the bolt holes, are provided through the wheels and spacers of the rotor to accommodate a plurality of circumferentially spaced tubes extending generally axially through the rotor for supplying steam to the steam-cooled parts, i.e., first and second stage rotor buckets, and returning the spent cooling steam to the rotor bore assembly. The supply and return tubes are thin-walled structures which extend through openings in bushings provided in circumferentially spaced apertures of the stacked wheels and spacers. Tight clearances between the tubes and bushing openings are highly desirable. The steam-carrying tubes desirably have as large a diameter as possible to maximize steam flow, as well as have very tight clearances with the openings to preclude high stresses on the tubes. Thus, there is a need to tightly tolerance the openings through the wheels and spacers which carry the steam-cooling tubes while concurrently enabling radial contraction of the wheels to form tightly rabbeted joints.

SUMMARY OF THE INVENTION

In accordance with the present invention, a plurality of alignment pins are employed in a fixture for reception in the openings of the wheels and spacers. The alignment pins are specifically configured to allow for radial misalignment of the openings due to thermal expansion and contraction, tolerance stack-up and wheel-to-spacer mismatch due to rabbet mechanical growth. The alignment pins, however, enable closely toleranced circumferential alignment of the wheels, spacers and aft shaft bushing openings sufficiently to install the steam-carrying tubes into the aligned openings after the rotor has been constructed with a tight clearance and minimal stress in use. The configuration of the alignment pins allows tight tangential alignment of the wheels and spacers without constricting radial alignment thereof and enables the pins to find the average position of all the openings so that the most each opening can be off in a circumferential direction is the opening's tolerance relative to the average true circumferential position of each pin. To accomplish this, the alignment pins have a radial dimension less than their dimension in the circumferential direction. Preferably, the pins are generally hexagonal in cross-sectional configuration with major and minor axes extending in circumferential and radial directions.

To accomplish the foregoing, the rotor fixture comprises a stand having a plurality of precision-located alignment openings which receive alignment pins circumferentially spaced from one another. The pins upstand from the fixture. Each pin has a cross-section with a radial dimension substantially less than its circumferential dimension to accommodate radial expansion and contraction during assembly of the rotor, while at the same time affording alignment of the wheels and spacers so that the average position of all the aligned openings is equal to or less than the tolerance of the openings relative to the average true position of each pin.

To form the stack in accordance with the present invention, the bolts are also provided on the fixture and upstand the full length of the stack. The height of the alignment pins above the fixture is adjustable so that the pins can be periodically raised as the wheels and spacers are stacked one on top of the other. (The following description proceeds with stacking four wheels and three spacers on an aft shaft to form a four-stage rotor, with the aft wheel being designated the fourth wheel and the forward wheel the first wheel, it being appreciated that the stacking method hereof can be applied to rotors having different numbers of wheels and spacers and hence a different number of stages.) To begin the rotor assembly, the aft shaft including the integral aft shaft disk is disposed on the fixture with the bolts being received through bolt apertures on the aft shaft disk and the alignment pins being received through slave bushings on the aft shaft disk. With the aft shaft on the fixture, an initial wheel, e.g., the fourth wheel, is heated in an oven. Once the fourth wheel is heated, it is placed on the aft shaft disk with the bolts and alignment pins being received through its bolt holes and openings, respectively. By initially heating the fourth wheel, the forwardly directed flange of the aft shaft disk lies radially inwardly of the now radially expanded, axially directed, aft flange of the fourth wheel. While the fourth wheel remains heated, the 3-4 spacer is then applied to the fixture with the bolts being received in the bolt holes of the spacer and the alignment pins being received in the spacer openings. The aft-directed flange of the 3-4 spacer is received radially within the radially expanded forwardly directed flange of the fourth wheel. The fourth wheel is then allowed to cool. Consequently, the aft flange of the fourth wheel tightly engages the forward flange of the aft shaft disk and the forward flange of the fourth wheel engages the aft flange of the 3-4 spacer to form tight rabbeted joints. It will be appreciated that the fourth wheel contracts radially as it is allowed to cool down and engage the corresponding flanges.

The alignment pins are then elevated in the fixture to receive the next wheel/spacer set, i.e., the third wheel and the 2-3 spacer. The third wheel is first heated and applied over the bolts and alignment pins similarly as the fourth wheel and the 34 spacer were applied over the bolts and alignment pins. It will be appreciated that the radial contraction of the third wheel during cool-down enables a tight fit between the flanges of the third wheel and the 2-3 and 3-4 spacers on axially opposite sides of the third wheel to form the rabbeted joints. After cool-down, the alignment pins are again raised relative to the fixture to receive the second wheel and 1-2 spacer. The second wheel is thus heated and the heated second wheel and 1-2 spacer are similarly applied to the bolts and alignment pins. After cool-down of the second wheel forming the tightly engaged rabbeted joints between the second wheel and the 1-2 and 2-3 spacers on axially opposite sides of the second wheel, the first or final wheel is heated, similarly applied to the bolts and alignment pins and allowed to cool down to form the rabbeted joint with the 1-2 spacer.

It will be appreciated that upon cooling of the wheels, the flanges radially contract to form portions of the rabbeted joints. That radial contraction is accommodated by the large clearance between the reduced radial dimension of the alignment pins and the openings through the wheels and spacers. However, because the alignment pins have a circumferential dimension corresponding to the tolerance of each spacer or wheel opening relative to the average true position of each pin, a tight alignment of the wheel and spacer openings in a circumferential direction is achieved.

In a preferred embodiment according to the present invention, there is provided a fixture for forming a turbine rotor having stacked axially aligned wheels and spacers, each of the wheels and spacers having a plurality of circumferentially spaced openings thereabout for alignment with one another, comprising a support having an axis for registration with axes of the aligned wheels and spacers, at least a pair of alignment rods spaced radially from the axis of the support and circumferentially from one another, the rods being located about the support for reception in the openings through the wheels and spacers, each of the rods having a radial dimension less than a circumferential dimension such that spacing between the rods and margins of the openings in a radial direction is greater than spacing between the rods and margins of the openings in a circumferential direction.

In a further preferred embodiment according to the present invention, there is provided a method of stacking a plurality of wheels and spacers forming a rotor for a turbine, the wheels and spacers having a plurality of circumferentially spaced, axially extending openings spaced radially from axes of the wheels and spacers, comprising the steps of providing a support fixture having an axis, disposing a plurality of alignment rods about the fixture in circumferentially spaced relation to one another about and generally parallel to the axis, each rod having a cross-section with a radial dimension less than a horizontal dimension and disposing the wheels and spacers on the support fixture with the alignment rods extending through the openings with clearances between the rods and margins of the openings being greater in a radial direction than in a circumferential direction.

BRIEF DESCRIPTION OF THE DRAWINGS

FIGS. 4–7 are fragmentary cross-sectional views of the fixture illustrating the step-by-step stacking of the rotor wheels and spacers; and FIG. 8 is an enlarged plan view of an alignment pin.

DETAILED DESCRIPTION OF THE INVENTION

Figure 1:
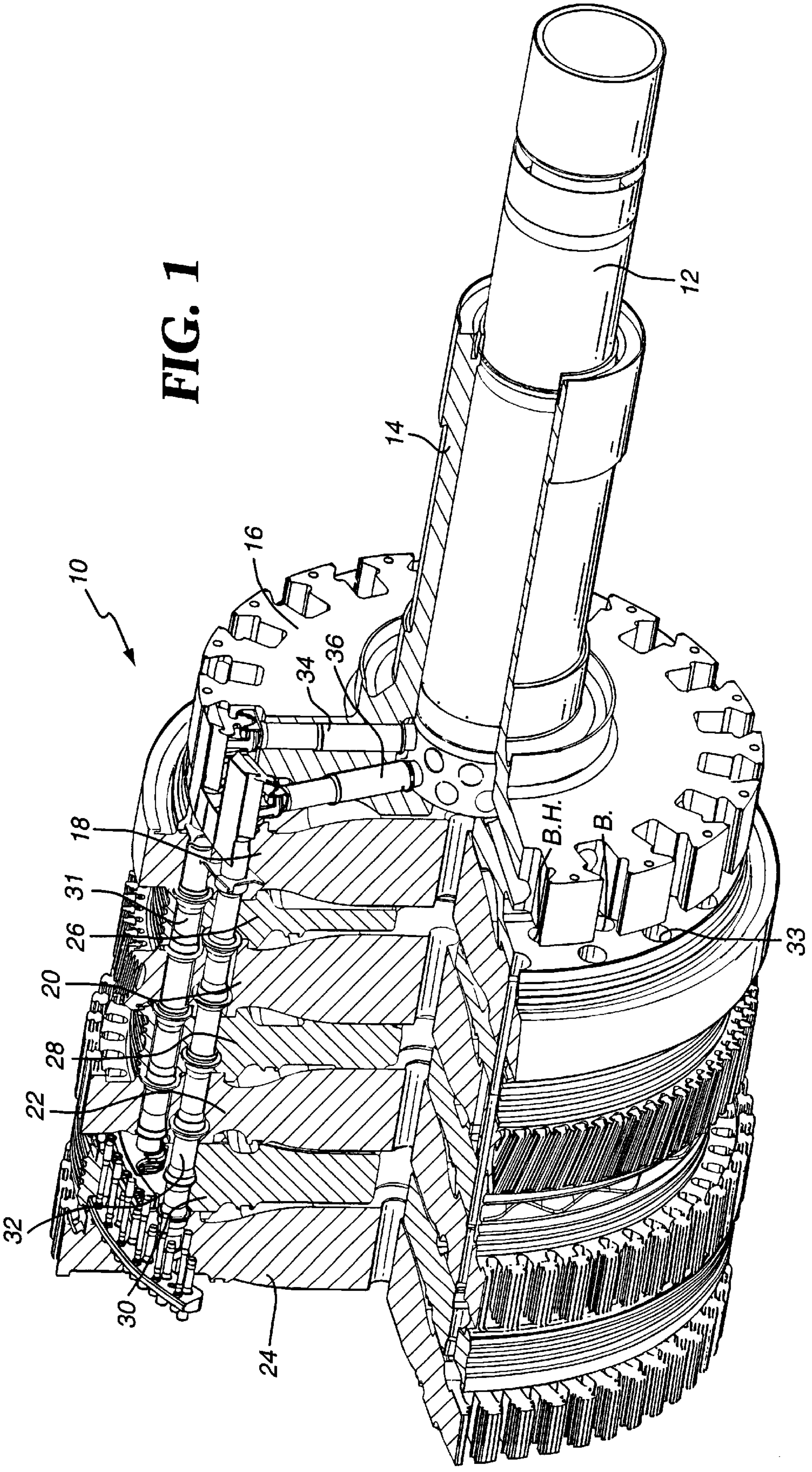
FIG. 1 is a fragmentary perspective view of a gas turbine rotor with parts broken out and in cross-section illustrating a stacked rotor wheel and spacer construction with steam tubes applied in accordance with the present invention.

Referring to FIG. 1, there is illustrated a portion of a gas turbine rotor, generally designated 10, assembled in accordance with the present invention. Rotor 10 includes an aft bore tube assembly 12, an aft shaft 14 having a forward aft shaft disk 16 and rotor wheels 18, 20, 22 and 24 axially spaced one from the other by spacers 26, 28 and 30. In the illustrated preferred embodiment, the rotor turbine comprises four stages, each including a wheel and a spacer, the first stage being only partially shown. The outer rims of the wheels mount turbine buckets, not shown, while the outer rims of the spacers lie in radial opposition to nozzles, also not shown. The advanced gas turbine design of assignee, part of which is illustrated in FIG. 1, comprises a steam-cooled, four-stage turbine having steam supply and return tubes 31 and 32, respectively. Tubes 31 and 32 are circumferentially spaced about and extend axially of the rotor 10 and lie in communication with radial steam supply and return tubes 34 and 36, respectively. Steam is supplied through the bore tube assembly 12 to the radial tubes 34 and returning spent cooling steam is supplied to the bore tube assembly 12 from radial tubes 36. The stack of wheels, spacers and aft shaft disk are bolted one to the other as in conventional rotor construction, a bolt B being illustrated. Thus, the bolt holes B.H. pass axially through each of the wheels and spacers and lie in axial registry with one another at circumferentially spaced-apart positions at locations radially inwardly of the steam tubes 31 and 32. As noted previously, the steam tubes 31 and 32 are thin-walled structures inserted into the rotor after assembly and which require close tolerance fit-ups with the openings 33 through the wheels, spacers and aft shaft disk. Consequently, the present invention provides a fixture, generally designated 40, in FIGS. 2 and 3, for stacking the wheels, spacers and aft shaft disk to form the rotor assembly 10 with the steam tube openings aligned and tightly toleranced.

Figure 2:
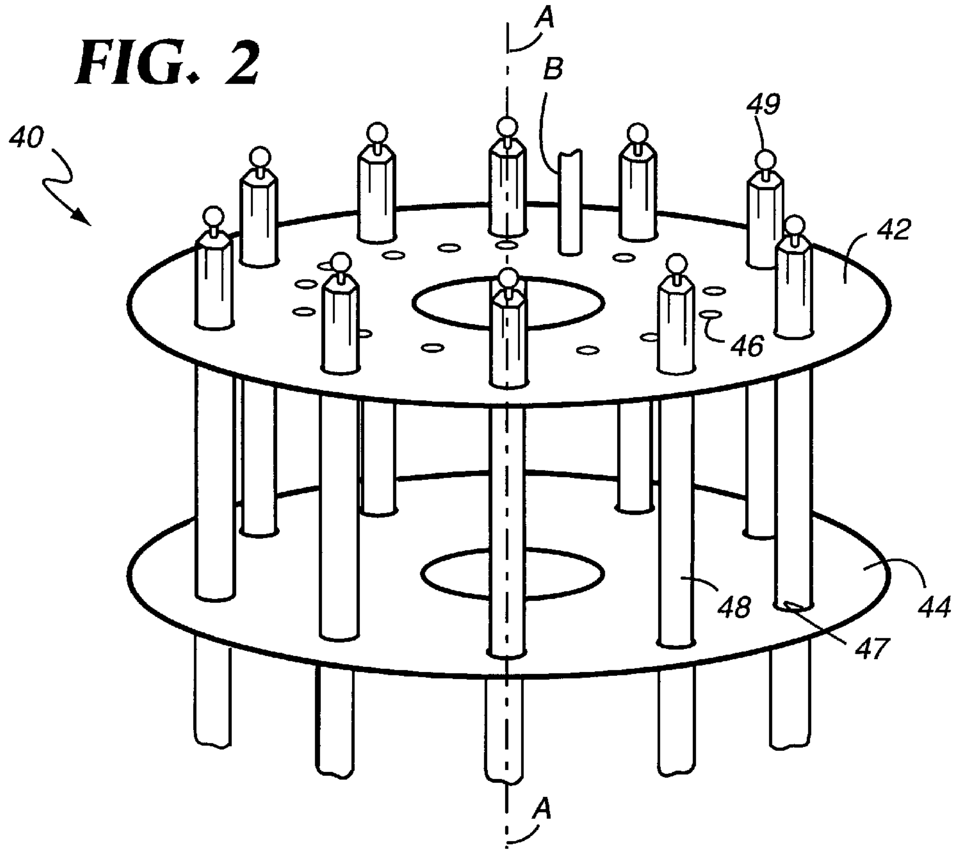
FIG. 2 is a schematic perspective illustration of a rotor fixture employing the alignment pins of the present invention.
Figure 3:
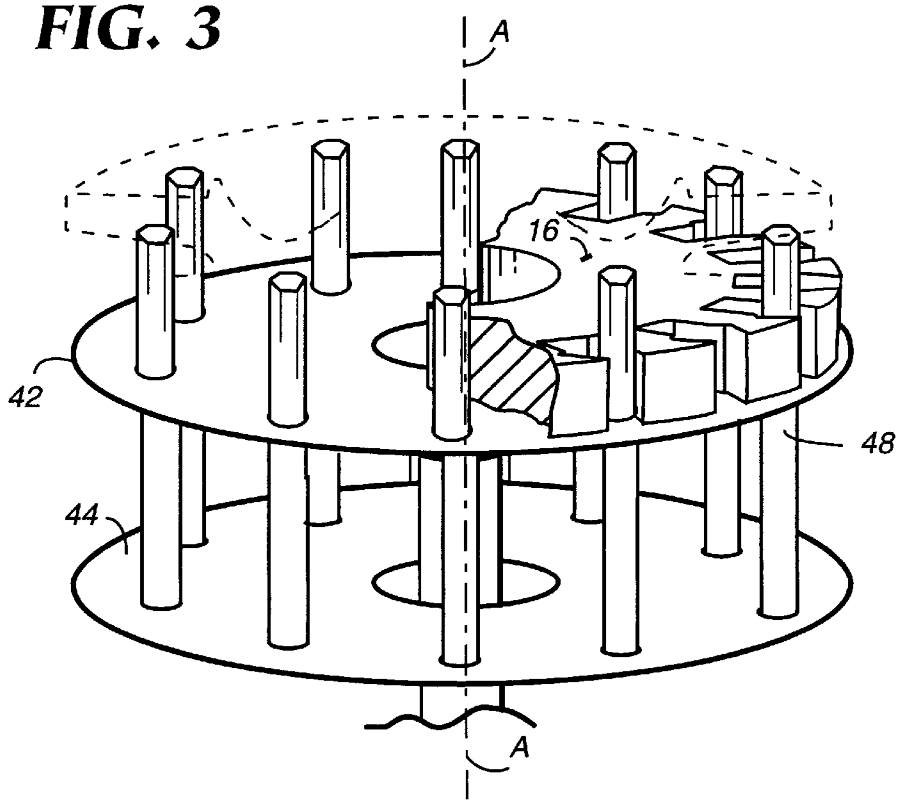
FIG. 3 is a view similar to FIG. 2 illustrating the aft shaft of a rotor stackup mounted on the alignment fixture.

Referring to the fixture 40 illustrated in FIG. 2, a pair of fixture plates 42 and 44 are spaced vertically one from the other and are aligned about an axis A. Each plate includes a plurality of bolt holes 46 which receive elongated bolts B which extend the length of the rotor for securing the wheels, spacers and aft shaft to one another. The circle of bolt openings 46 lies radially inwardly relative to a circle of steam tube openings in each of the fixture plates 42 and 44. The plates 42 and 44 are accurately precision-mounted relative to one another and have alignment rods 48 extending through the registering aligned openings 47. The rods 48 are slidable vertically within the openings to selected adjusted positions and are selectively retained in those positions by pins extending through lateral holes, not shown, in the rods 48 bearing against the stops maintaining the rods at a selected elevation. The rods terminate at their upper ends in eyehooks 49 such that they can be grasped and raised to a higher elevation, as will become clear from the ensuing description.

The purpose of the alignment pins is to circumferentially align the wheels, spacers and aft shaft disk openings 33 sufficiently to install the steam tubes at a later time. The pins are also designed to allow for radial opening misalignment due to thermal expansion, tolerance stack-up and wheel-to-spacer mismatch due to rabbet mechanical growth. As best illustrated in FIG. 8, each of the alignment rods 48 has a radial dimension a, the direction of which is indicated by the arrow in FIG. 8 substantially less than its dimension b in a circumferential direction. The cross-sectional shape of the alignment rods 48 is preferably generally hexagonal with a minimum dimension in a radial direction and a larger maximum dimension in a circumferential direction at the circumferential edge 50 of the alignment rods. This particular dimensional configuration of the alignment rods enables tangential alignment of the wheels, spacers and aft shaft disk without constricting radial alignment thereof and enables the rods to find the average position of all the openings so that the most each opening can be off in a circumferential direction is an opening's tolerance relative to the average true circumferential position of each pin.

Figure 4:
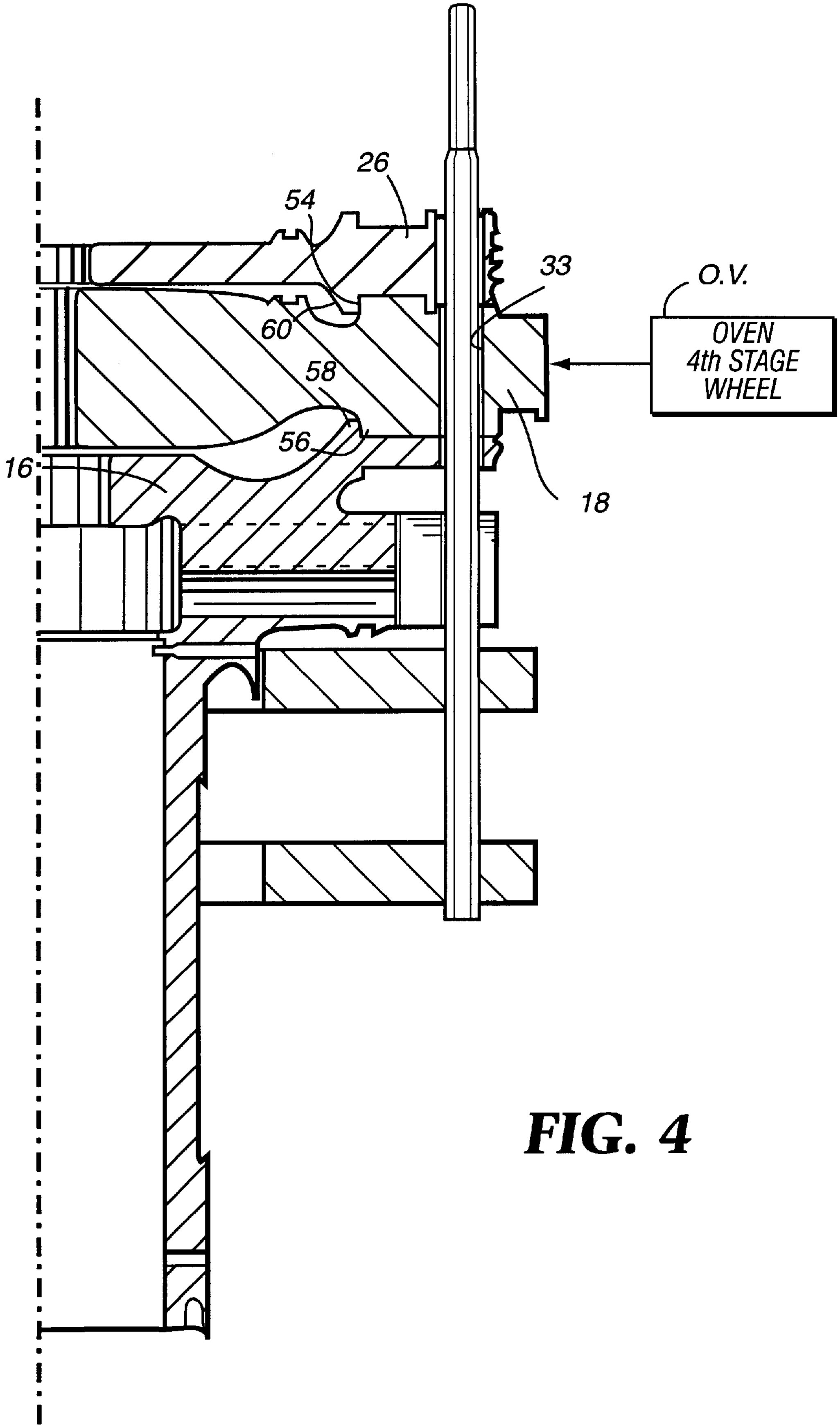

Referring back to FIG. 3, the first step in the assembly of the rotor is to dispose the aft shaft 14 on the fixture with the aft shaft disk 16 resting on the upper fixture plate 42. The aft shaft disk 16 has radially opening slots spaced circumferentially about its periphery for receiving the alignment rods 48, as well as the bolts (the bolts and bolt holes not being shown). Referring to FIG. 4, and with the aft shaft disk on the upper fixture plate 42, the fourth wheel and the 3-4 spacer 26 are next applied to the aft shaft. Before placing the fourth wheel 18 on the fixture, fourth wheel 18 is heated in an oven O.V. such that the forward and aft axially extending flanges 54 and 56, respectively, are thermally radially expanded. After wheel 18 has been heated, wheel 18 is aligned with the alignment rods 48 and the bolts and lowered onto the forward face of the aft shaft disk 16. With the radial expansion of the aft flange 56 of wheel 18, the forward flange 58 of the aft shaft disk 60 is received within the expanded flange 56. On the forward axial face of wheel 18, the flange 54 likewise has expanded radially outwardly. The 3-4 spacer, at ambient temperature, is then applied to the fixture with its aft flange 60 lying radially inwardly of the wheel flange 54. It will be appreciated, upon cool-down, that the wheel 18 contracts in a radial direction to form a tight-fitting rabbeted joint between the forward and aft flanges of the wheel and the aft and forward flanges of the spacer and aft shaft disk, respectively. Radial contraction is accommodated by the cross-sectional configuration of the alignment rods (see FIG. 8) while the circumferential dimension of the alignment rods are closely toleranced to the wheel and spacer openings maintaining tight tolerances in the circumferential direction.

Figure 5:
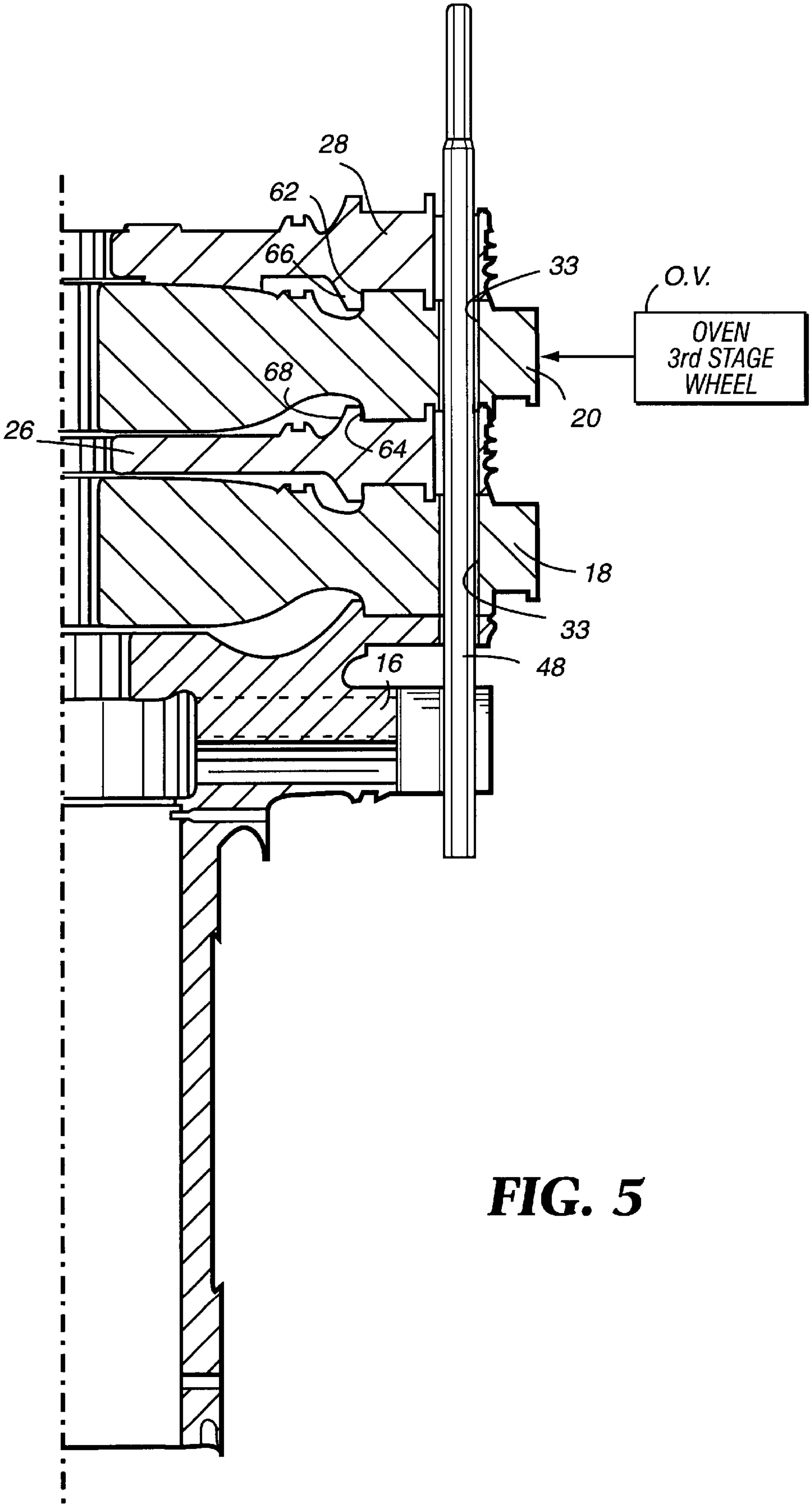

Referring now to FIG. 5, the next wheel and spacer combination, i.e., the third wheel 20 and the 2-3 spacer 28 are applied to the stack. The alignment rods are first elevated to accommodate the wheel 20 and spacer 28. Similarly as with the fourth wheel 18, the third wheel 20 is likewise initially heated in the oven O.V. Wheel 20 is then lowered onto the alignment rods and bolts for engagement against the forward face of the 3-4 spacer 26. The 2-3 spacer 28 is next lowered, at ambient temperature, onto the alignment rods and bolts for disposition on the forward face of the third wheel 20. It will be appreciated that the respective forward and aft flanges 62 and 64, respectively, of the third wheel 20 radially contract for tight fitting engagements with the aft flange 66 and forward flange 68 of the 2-3 spacer 28 and the 34 spacer 26, respectively. Thus, upon contraction of the heated wheel 20, forward and aft rabbeted joints are formed with the adjoining spacers 28 and 26, respectively. The alignment rods accommodate the radial contracting movement while maintaining the circumferential alignment of the stacked wheels and spacers in a closely toleranced fit relative to the circumferential dimension of the alignment rods.

Figure 6:
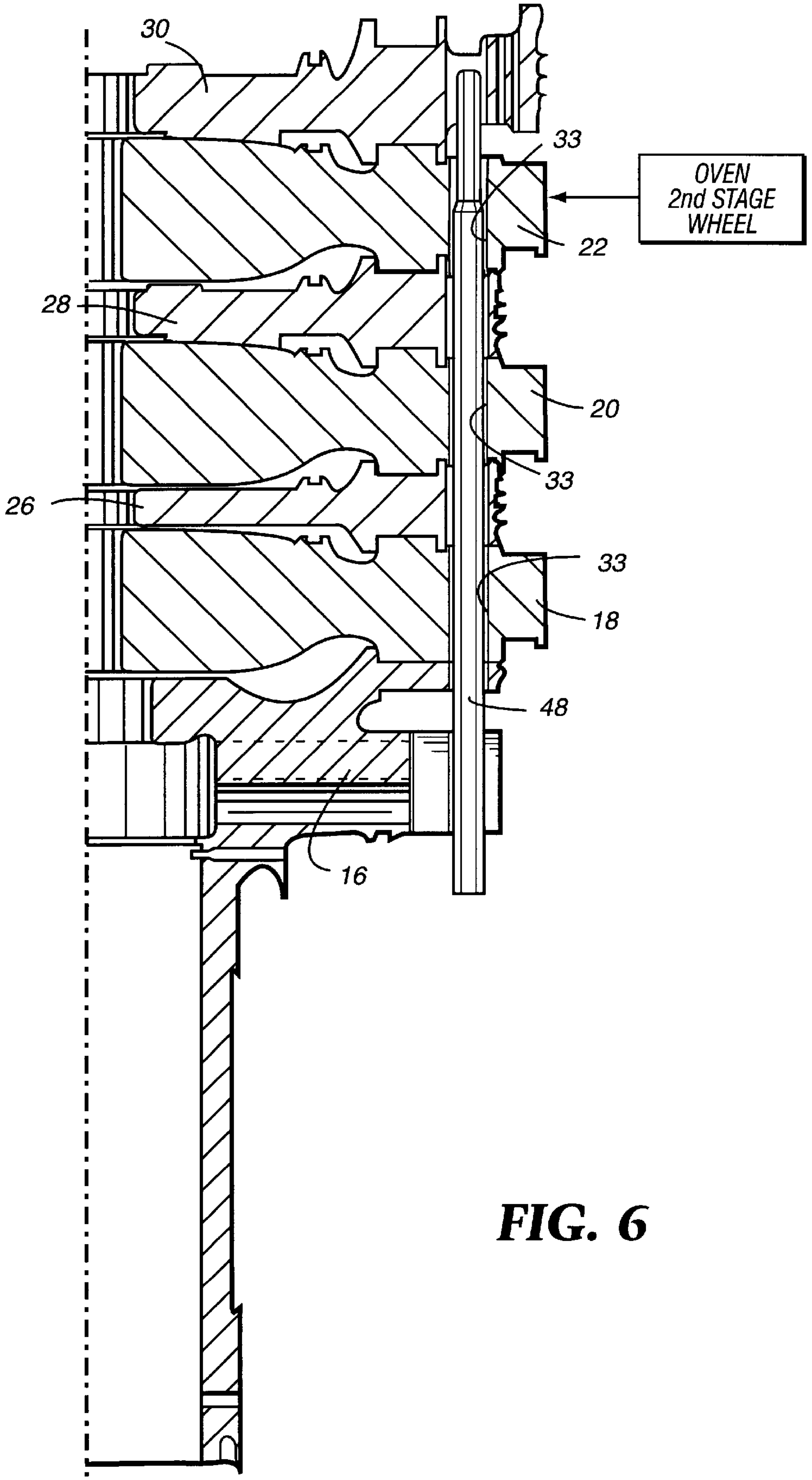

Referring now to FIG. 6, the alignment rods are once again elevated to a height to accommodate the next wheel and spacer combination disposed on the stack. Prior to lowering the second wheel 22 onto the stack, the second wheel is placed in oven O.V. to heat the wheel and radially expand the axial flanges for forming the rabbet joint. After heating, the third wheel is lowered onto the bolts and alignment rods and the 1-2 spacer 30, at ambient temperature, is then lowered on top of the heated second wheel 22. As in the prior spacer/wheel combinations, the heat expanded flanges of the third wheel contract in a radial inward direction to engage and form rabbeted joints with the axially directed flanges of the 1-2 spacer 30 and 2-3 spacer 28. Finally, and referring to FIG. 7, the first-stage wheel 18 is heated in oven O.V. and lowered onto the bolts and alignment rods. Its aft-facing flange contracts radially inwardly upon cooling to engage the forward flange of the 1-2 spacer 30 to form the rabbeted joint therewith.

At this stage, the wheels, spacers and aft shaft disk are aligned with very close and tight tolerances in the circumferential direction. The rabbeted joints maintain the openings in radial alignment with one another. Thus, the steam tubes may be disposed axially through the axially aligned registering openings of the spacers, wheels and aft disk with very tight tolerances therebetween.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of stacking a plurality of wheels and spacers forming a rotor for a turbine, the wheels and spacers having a plurality of circumferentially spaced, axially extending openings spaced radially from axes of the wheels and spacers, comprising the steps of:

providing a support fixture having an axis;

disposing a plurality of alignment rods about said fixture in circumferentially spaced relation to one another about and generally parallel to said axis, each rod having a cross-section with a radial dimension less than a circumferential dimension; and disposing said wheels and spacers on said support fixture with said alignment rods extending through said openings with clearances between said rods and margins of said openings being greater in a radial direction than in a circumferential direction.

2. A method according to claim 1 wherein the wheels and spacers alternate along the rotor axis and have rabbeted joints therebetween in final assembly, the rabbeted joints being formed by axially projecting flanges of the wheels and spacers engaging one another in a radial direction, and including the steps of heating at least one wheel to radially expand a wheel flange, disposing the one heated wheel on the support fixture and engaging the one wheel and an adjoining spacer in the stack on the support fixture enabling the heated expanded wheel flange to engage a flange on said adjoining spacer to form the rabbeted joint therebetween upon cool-down.

3. A method according to claim 1 wherein the wheels and spacers each have a circular array of holes for receiving bolts for securing the stacked wheels and spacers to one another to form the rotor, and including the steps of disposing a plurality of bolts about said support fixture, and disposing said wheels and spacers on said support fixture with the bolts being received in the bolt holes.

4. A method according to claim 3 wherein said openings lie radially outwardly of said circular array of holes.

* * * * *

UNITED STATES PATENT AND TRADEMARK OFFICE

CERTIFICATE OF CORRECTION

PATENT NO. : 6,438,837 B1
APPLICATION NO. : 09/534048
DATED : August 27, 2002
INVENTOR(S) : Berry et al.

It is certified that error appears in the above-identified patent and that said Letters Patent is hereby corrected as shown below:

In Column 1, immediately below the title, insert:

--The Government of the United States of America has rights in this invention pursuant to Contract No. DE-FC21-95MC31176 awarded by the U. S. Department of Energy.--

Signed and Sealed this

Twentieth Day of February, 2007

JON W. DUDAS
*Director of the United States Patent and Trademark Office*